(12) United States Patent
Hügel et al.

(10) Patent No.: US 11,739,821 B2
(45) Date of Patent: Aug. 29, 2023

(54) TORQUE TRANSMISSION APPARATUS HAVING DRY-OPERATED SEPARATING CLUTCH

(71) Applicant: Schaeffler Technologies AG & Co. KG, Herzogenaurach (DE)

(72) Inventors: Christian Hügel, Rheinau (DE); Thorsten Krause, Bühl (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 47 days.

(21) Appl. No.: 17/610,478

(22) PCT Filed: May 12, 2020

(86) PCT No.: PCT/DE2020/100403
§ 371 (c)(1),
(2) Date: Nov. 11, 2021

(87) PCT Pub. No.: WO2020/228906
PCT Pub. Date: Nov. 19, 2020

(65) Prior Publication Data
US 2022/0221038 A1     Jul. 14, 2022

(30) Foreign Application Priority Data
May 14, 2019   (DE) ..................... 10 2019 112 571.5

(51) Int. Cl.
*F16H 45/02*     (2006.01)
*B60K 6/387*     (2007.10)
*F16H 45/00*     (2006.01)

(52) U.S. Cl.
CPC ............. *F16H 45/02* (2013.01); *B60K 6/387* (2013.01); *F16H 2045/002* (2013.01); *F16H 2045/0215* (2013.01)

(58) Field of Classification Search
CPC ............... F16H 45/02; F16H 2045/002; F16H 2045/0215; F16D 25/0635; F16D 25/082; F16D 25/088; F16D 25/14
See application file for complete search history.

(56) References Cited

U.S. PATENT DOCUMENTS

2010/0081540 A1*   4/2010   Krause ..................... B60K 6/48
477/3

FOREIGN PATENT DOCUMENTS

DE          4322485 A1     1/1994
DE     102008026426 A1 *   12/2008  ............... B60K 6/40
(Continued)

*Primary Examiner* — Huan Le

(57) ABSTRACT

A torque transmission apparatus for transmitting a torque between a first drive element and an output element, including a torque converter, having a torque converter input, which is rotatable about a rotation axis (A) and is coupled to the first drive element, and a torque converter output, which can be connected to the output element. A separating clutch arranged outside of the torque converter and effectively between the first drive element and the torque converter, having a clutch input and a clutch output, which can be connected thereto by the action of a clutch actuating apparatus. The clutch actuating apparatus having a pressure means chamber and a pressure means channel (K4) supplying said pressure means chamber with pressure means, and the separating clutch being dry-operated and the pressure means channel (K4) extending through the torque converter at least in portions.

20 Claims, 1 Drawing Sheet

(56) References Cited

FOREIGN PATENT DOCUMENTS

| | | |
|---|---|---|
| DE | 102008026426 A1 | 12/2008 |
| DE | 102009020672 A1 | 12/2009 |
| DE | 102009042050 A1 | 4/2010 |
| JP | 2003063264 A | 3/2003 |

* cited by examiner

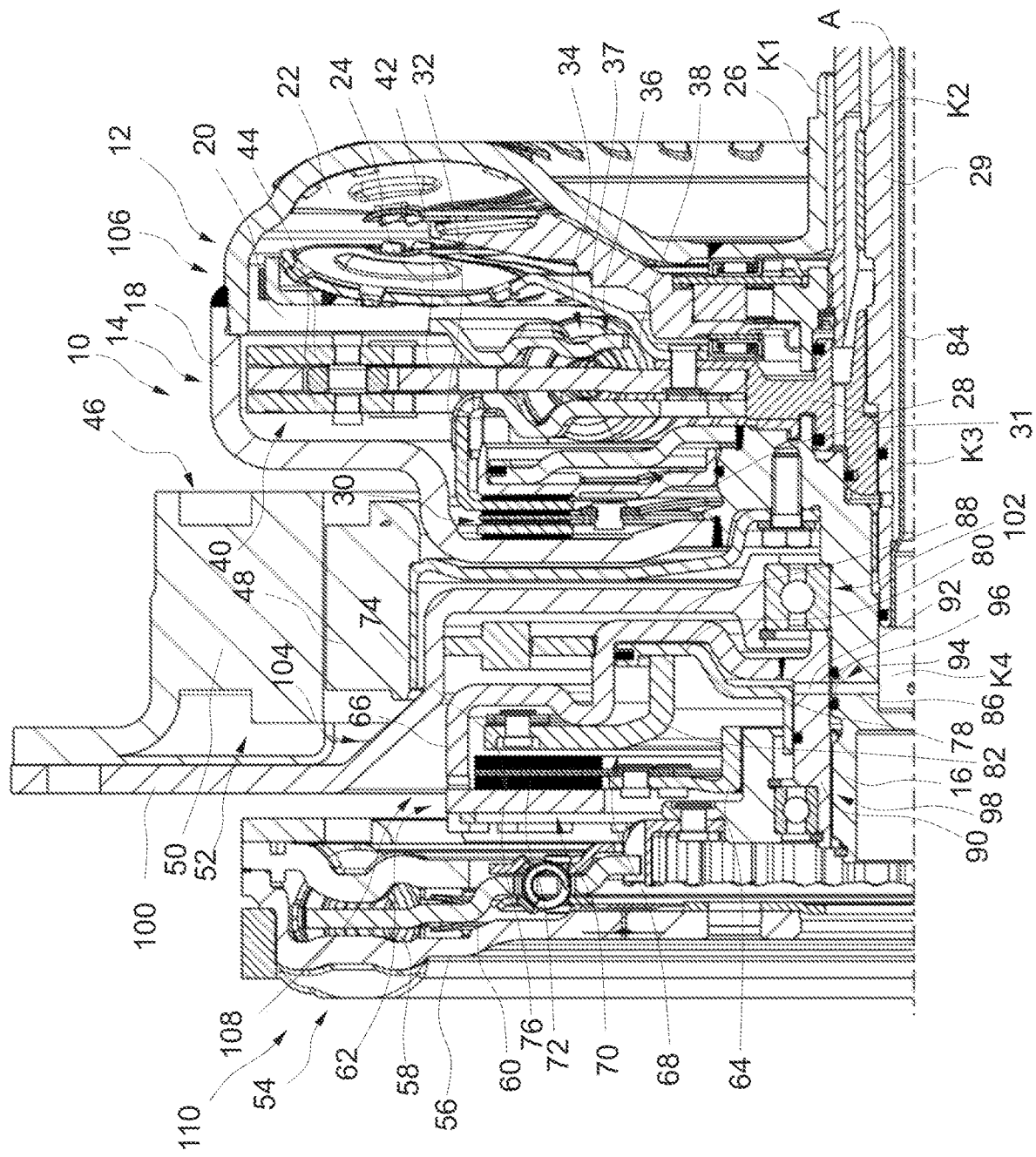

TORQUE TRANSMISSION APPARATUS HAVING DRY-OPERATED SEPARATING CLUTCH

CROSS-REFERENCE TO RELATED APPLICATIONS

This application is the U.S. National Phase of PCT Appln. No. PCT/DE2020/100403 filed May 12, 2020, which claims priority to DE 102019112571.5 filed May 14, 2019, the entire disclosures of which are incorporated by reference herein.

TECHNICAL FIELD

The disclosure relates to a torque transmission apparatus according to the preamble of claim 1.

BACKGROUND

A torque transmission apparatus is known for example from DE 10 2009 020 672 A1. The torque transmission apparatus is arranged in a hybrid drive train between a first drive element and a transmission and comprises a torque converter, which is connected to a transmission input shaft, a separating clutch and an electric machine. The electric machine, the separating clutch and the torque converter are designed as preassembled structural units and in the assembled state, the torque converter and the separating clutch are sealed in a liquid-tight manner from the electrical machine.

SUMMARY

The object of the present disclosure is to improve a torque transmission apparatus. The installation space and the costs of a torque transmission apparatus should be reduced. The power losses of the torque transmission apparatus should be reduced.

At least one of these objects is achieved by a torque transmission apparatus with the features described herein and in the claims. As a result, a space-saving and inexpensive actuation of the dry separating clutch can be achieved.

The torque transmission apparatus can be arranged in a drive train of a vehicle, in particular a motor vehicle. The first drive element can be an internal combustion engine.

The torque converter input can comprise a torque converter housing and/or a component connected thereto, for example a housing hub. The torque converter input can be coupled to the torque converter output via a torsional vibration damper.

The torque converter output can comprise a torque converter output hub.

A torsional vibration damper can effectively be arranged in front of the separating clutch. The torsional vibration damper can have a damper input part and a damper output part that can be rotated to a limited extent with respect to the damper input part via the action of at least one spring element. The spring element can be designed as a bow spring. The damper output part can be connected to the clutch input for conjoint rotation. The torsional vibration damper can have a centrifugal pendulum.

The separating clutch can comprise a friction set, having at least one input-side and/or output-side friction plate, which can be connected in a frictionally effective manner to a counter-friction surface via the clutch actuating apparatus. The friction set can be operated free of a cooling fluid.

The clutch actuating apparatus can be actuated fully hydraulically or via a CSC clutch actuation. The clutch actuating apparatus can have a clutch actuation element, for example a pressure pot. The clutch actuation element can be movable on the clutch output or the torque converter input in a pressure-tight manner.

The clutch actuating apparatus can bring about an actuation pressure in the separating clutch via the pressure medium. The actuation pressure can cause an actuation force on the separating clutch. The actuation force can be supported within the separating clutch. The separating clutch can have a closed flow of actuating force.

In a preferred embodiment of the disclosure, the torque converter is arranged axially between the output element and the separating clutch.

In a further preferred embodiment of the disclosure, the pressure medium channel comprises a first through opening in the torque converter input.

In a special embodiment of the disclosure, the torque converter output can be connected to an input shaft of the output element and the pressure medium channel runs in portions in the input shaft. The pressure medium channel can run essentially axially through the torque converter, in particular essentially axially through the input shaft.

In a preferred embodiment of the disclosure, the clutch output has a second through opening, which can be hydraulically connected to the first through opening.

In a preferred embodiment of the disclosure, the pressure medium channel has a pressure medium transition formed between the torque converter and the separating clutch and is sealed to the outside and connecting the first and second through openings. The pressure medium transition can be arranged directly between the torque converter input and the clutch output. At least one sealing element can be arranged between the torque converter input and the clutch output, in particular for sealing the pressure medium transition.

In an advantageous embodiment of the disclosure, the clutch output can be connected non-rotatably to the torque converter input. The clutch output can have an output flange and a clutch output hub. The clutch output hub can be directly non-rotatably connectable to the torque converter input, in particular to the housing hub.

In a special embodiment of the disclosure, the clutch output and the torque converter input are arranged coaxially.

In a preferred embodiment of the disclosure, the clutch output and/or the torque converter input is non-rotatably connected to a second drive element. The second drive element can be an electric motor with a fixed stator and a rotor, which is rotatable about a rotation axis. The rotor can be arranged axially between the torque converter and the separating clutch. The rotor can be arranged radially outside of the separating clutch. The rotor can be permanently connected to the torque converter input, for example to the torque converter housing.

The torque transmission apparatus can be arranged in the hybrid drive train. The torque transmission apparatus can be designed as a hybrid module. The first and second drive elements can drive a vehicle in parallel or alternately.

An intermediate wall can be arranged axially between the separating clutch and the torque converter and/or the second drive element. As a result, the second drive element can be kept free from contamination by the separating clutch. The intermediate wall can be connected radially on the inside to a bearing element by which the torque converter can be supported. The torque converter input can be rotatable relative to the intermediate wall via the bearing element. The intermediate wall can be firmly connected to a transmission housing. The intermediate wall can have a curved portion through which the intermediate wall extends radially outside the rotor radially inwards in an axially offset manner relative to the rotor and radially inside the rotor in an axially overlapping manner relative to the rotor radially inwards.

The torque transmission apparatus can be constructed from at least two modules. The first module can be formed from the torque converter with an associated second drive element and the second module can be formed from the separating clutch. The torsional vibration damper can be assigned to the second module or formed as an independent third module.

Further advantages and advantageous embodiments of the disclosure result from the description of the figures and the drawings.

BRIEF DESCRIPTION OF THE DRAWINGS

The disclosure is described in detail below with reference to the drawing.

FIG. 1 shows a half-section of a torque transmission apparatus 10 in a specific embodiment of the disclosure. The torque transmission apparatus 10 can be arranged in a drive train of a motor vehicle and can transmit a torque from a first drive element, for example an internal combustion engine, to an output element, for example a transmission.

DETAILED DESCRIPTION

The torque transmission apparatus 10 comprises a torque converter 12, having a torque converter input 14, which is rotatable about a rotation axis A and is coupled to the first drive element and which has, in particular, a housing hub 16 and a torque converter housing 18 firmly connected thereto, in particular welded thereto. The torque converter housing 18, together with the housing hub 16, encloses a fluid space 20 in which there is a working fluid that can be supplied and discharged through a working fluid channel K1 and a further working fluid channel K2. The working fluid enables torque to be transmitted between a pump 22 fixedly connected to the torque converter housing 18 and a turbine 24. The torque converter housing 18 is firmly connected to a pump neck 26, which can drive a fluid pump for delivering the working fluid. The turbine 24 is riveted to a torque converter output 28, in particular a torque converter output hub. The torque converter output 28 is non-rotatably connected to an input shaft 29 of the output element, for example a transmission input shaft.

A converter bridging clutch 30 is arranged inside the torque converter housing 18, which causes a torque transmission between the torque converter input 14 and the output hub 28 to bypass the torque transmission possible between the pump 22 and the turbine 24. The converter bridging clutch 30 is actuated by an actuating device 31 as a function of a fluid pressure in an actuating channel K3. A clutch output 32 of the converter bridging clutch 30 is connected to a torsional vibration damper 34. The torsional vibration damper 34 has a damper input part 36 and a damper output part 38 which can be rotated to a limited extent relative to the damper input part 36 via the action of compression springs 37. The clutch output 32 is non-rotatably connected to the damper output part 36. The damper output part 38 is connected to a centrifugal pendulum 40. The centrifugal pendulum 40 comprises a pendulum flange 42 on which pendulum masses 44, which can be moved to a limited extent along a pendulum track, are arranged. The pendulum flange 42 is designed in one piece with the damper output part 38.

The torque converter input 14 is connected to an electric motor 46. The electric motor 46 has a rotor 48, which rotatable about the rotation axis A and a fixed stator 50. The stator 50 can be firmly connected to a housing of the output element, for example a gear housing. The electric motor 46 forms a second drive element 52, which can cause torque to be introduced into the torque converter input 14.

The first drive element is connected to a torsional vibration damper 54. The torsional vibration damper 54 is designed as a dual-mass flywheel and comprises a damper input part 56 and a damper output part 60 which can be rotated to a limited extent relative to the damper input part 56 via the action of at least one spring element 58, here an arc spring. For example, a crankshaft of the first drive element can be firmly connected to the damper input part 56.

The damper output part 60 is connected to a separating clutch 62. The separating clutch 62 comprises a clutch input 64 and a clutch output 66, which can be connected to the clutch input 64 by the action of a clutch actuating apparatus 68. The damper output part 60 is non-rotatably connected to the clutch input 64. The clutch input 64 can be effectively connected to the clutch output 66 via a friction set 70 depending on the actuation position of the clutch actuating apparatus 68. The friction set 70 comprises an input-side friction plate 72 which, when actuated by the clutch actuating apparatus 68, can be frictionally connected to a counter-friction surface 74, here on a steel plate 76, which in turn is non-rotatably connected to the clutch output 66.

The separating clutch 62 can bring about a torque transmission between the first drive element and the torque converter 12 that is dependent on the actuation position of the clutch actuating apparatus 68. The separating clutch 62 is designed as a dry-operated separating clutch 62, in which the friction set 70 is operated free of a cooling fluid. The separating clutch 62 is arranged outside of the torque converter 12, which in turn is arranged axially between the output element and the separating clutch 62.

The clutch actuating apparatus 68 has a pressure medium chamber 78 which, when an actuation pressure is applied by a pressure medium, causes an actuation force on a pressure piston 80, which transmits the actuation force to a clutch actuation element 82, here a pressure pot, which in turn exerts a pressing force on the friction set 70. The actuation force is supported within the separating clutch 62. The separating clutch 62 has a closed flow of actuating force.

The pressure medium can be a fluid which is introduced into the pressure medium space 78 via a pressure medium channel K4. The pressure medium channel K4 runs at least in portions and essentially axially through the torque converter 12, as a result of which, in particular, a simple and space-saving clutch actuation of the separating clutch 62 can be implemented. The pressure medium channel K4 running axially through the torque converter 12 is designed as a bore in the input shaft 29 which is separated from the actuating channel K3 by a separating sleeve 84.

The pressure medium channel K4 comprises a first through opening 86 in the torque converter input 14, here in the housing hub 16. The clutch output 66 comprises an output flange 88, which is firmly connected to a clutch output hub 90, for example welded. The clutch output hub 90 has a second through opening 92, which is hydraulically connected to the first through opening 86.

An outwardly sealed pressure medium transition 94 is present between the first through opening 86 and the second through opening 92. The pressure medium transition 94 is arranged directly between the torque converter input 14 and the clutch output 66 and is sealed between the torque converter input 14 and the clutch output 66 by two sealing elements 96, in particular statically acting O-rings. The pressure piston 80 is arranged movably on the clutch output hub 90 in a pressure-tight manner. The clutch output hub 90 is non-rotatably connected to the torque converter input 14, for example via a toothing 98.

The rotor 48 is arranged axially between the torque converter 12 and the separating clutch 62 and radially outside of the separating clutch 62. An intermediate wall 100 is arranged axially between the separating clutch 62 and the torque converter 12 or the second drive element 52. As a result, the second drive element 52 can be kept free from contamination by the separating clutch 62.

The intermediate wall 100 is connected radially on the inside to a bearing element 102, by means of which the torque converter 12 can be supported on a housing of the output element, for example a transmission housing. The housing hub 16 of the torque converter input 14 can be rotated relative to the intermediate wall 100 via the bearing element 102. The intermediate wall 100 extends radially outside the rotor 48, axially offset from the rotor 48, radially inward and radially inside the rotor 48, axially overlapping with the rotor 48 radially inward. This axial bend is implemented by a curved portion 104 in the intermediate wall 100.

The torque transmission apparatus 10 is constructed from at least two modules. The first module 106 is formed from the torque converter 12 with an associated second drive element 52 and the second module 108 is formed from the separating clutch 62. The torsional vibration damper 54 can be assigned to the second module 108 or designed as an independent third module 110. As a result, simple assembly and an adaptable structure of the torque transmission apparatus 10 can be achieved.

LIST OF REFERENCE NUMBERS

10 Torque transmission apparatus
12 Torque converter
14 Torque converter input
16 Housing hub
18 Torque converter housing
20 Fluid space
22 Pump
24 Turbine
26 Pump neck
28 Torque converter output
29 Input shaft
30 Converter bridging clutch
32 Clutch output
34 Torsional vibration damper
36 Damper input part
37 Compression spring
38 Damper output part
40 Centrifugal pendulum
42 Pendulum flange
44 Pendulum masses
46 Electric motor
48 Rotor
50 Stator
52 Second drive element
54 Torsional vibration damper
56 Damper input part
58 Spring element
60 Damper output part
62 Separating clutch
64 Clutch input
66 Clutch output
68 Clutch actuator
70 Friction set
72 Friction plate
74 Counter friction surface
76 Steel plate
78 Pressure medium chamber
80 Pressure piston
82 Clutch actuation element
84 Separating sleeve
86 First through opening
88 Outlet flange
90 Clutch output hub
92 Second through opening
94 Pressure medium transmission
96 Sealing element
100 Intermediate wall
102 Bearing element
104 Curved portion
106 First module
108 Second module
110 Third module
A Rotation axis
K1 Working fluid channel
K2 Working fluid channel
K3 Actuation channel
K4 Pressure medium channel

The invention claimed is:

1. A torque transmission apparatus for transmitting a torque between a first drive element and an output element, comprising:
   a torque converter having a torque converter input, which is rotatable about a rotation axis (A) and is coupled to the first drive element, and a torque converter output, which can be connected to the output element,
   a separating clutch arranged outside of the torque converter and effectively arranged between the first drive element and the torque converter, having a clutch input and a clutch output, which is selectively connected thereto by an action of a clutch actuating apparatus, wherein
   the clutch actuating apparatus has a pressure medium chamber and a pressure medium channel (K4) supplying said pressure medium chamber with pressure medium,
   the separating clutch is dry-operated and the pressure medium channel (K4) extends through the torque converter at least in portions, and
   the pressure medium channel (K4) comprises a first through opening in the torque converter input.

2. The torque transmission apparatus according to claim 1, wherein the torque converter is arranged axially between the output element and the separating clutch.

3. The torque transmission apparatus according to claim 1, wherein the torque converter output is connected to an input shaft of the output element and the pressure medium channel (K4) runs in portions in the input shaft.

4. The torque transmission apparatus according to claim 1, wherein the clutch output has a second through opening, which is hydraulically connected to the first through opening.

5. The torque transmission apparatus according to claim 4, wherein the pressure medium channel (K4) has a pressure medium transition formed between the torque converter and the separating clutch and outwardly sealed and connecting the first and second through openings.

6. The torque transmission apparatus according to claim 5, wherein the pressure medium transition is arranged directly between the torque converter input and the clutch output.

7. The torque transmission apparatus according to claim 1, wherein the clutch output is connected to the torque converter input in a rotationally fixed manner.

8. The torque transmission apparatus according to claim 7, wherein the clutch output and the torque converter input are arranged coaxially.

9. The torque transmission apparatus according to claim 7, wherein the clutch output or the torque converter input is connected to a second drive element in a rotationally fixed manner.

10. A torque transmission apparatus for transmitting a torque between a drive element and an output element, comprising:
    a torque converter including:
        a housing hub coupled to the drive element;
        a housing fixedly connected to the housing hub;
        a pump fixedly connected to the housing; and
        a turbine disposed between the pump and the housing and in fluid communication with the pump, the turbine being coupled to an input shaft of the output element; and
    a separating clutch arranged outside of the torque converter and effectively arranged between the drive element and the torque converter, the separating clutch having a pressure medium chamber and a pressure medium channel arranged to supply the pressure medium chamber with pressure medium;
    wherein the separating clutch is dry-operated;
    wherein the pressure medium channel extends axially through the input shaft, the pressure medium channel including a through opening extending radially through the housing hub.

11. The torque transmission apparatus according to claim 10, wherein the separating clutch includes a clutch output non-rotatably connected to the housing hub, the pressure medium channel including a further through opening extending radially through the clutch output.

12. The torque transmission apparatus according to claim 11, wherein the further through opening is hydraulically connected to the through opening.

13. The torque transmission apparatus according to claim 12, further comprising a pressure medium transition formed between the housing hub and the clutch output, the pressure medium transition being outwardly sealed and connecting the through opening and the further through opening.

14. The torque transmission apparatus according to claim 13, wherein the pressure medium transition is arranged directly between the housing hub and the clutch output.

15. The torque transmission apparatus according to claim 11, wherein the further through opening is radially aligned with the through opening.

16. The torque transmission apparatus according to claim 11, wherein the separating clutch includes a clutch input, the clutch input being selectively connected to the clutch output by action of a clutch actuating apparatus.

17. The torque transmission apparatus according to claim 16, further comprising a torsional vibration damper coupled to the drive element and to the clutch input.

18. The torque transmission apparatus according to claim 11, further comprising a further drive element connected to at least one of the housing hub and the clutch output in a rotationally fixed manner.

19. The torque transmission apparatus according to claim 10, wherein the torque converter includes:
    a converter bridging clutch arranged between the housing and the turbine; and
    an actuating channel extending axially through the input shaft, the actuating channel being arranged to provide pressure medium to actuate the converter bridging clutch.

20. The torque transmission apparatus according to claim 19, wherein the pressure medium channel is separated from the actuating channel via a separating sleeve.

\* \* \* \* \*